US012800120B2

(12) United States Patent
Fischer et al.

(10) Patent No.: US 12,800,120 B2
(45) Date of Patent: Nov. 17, 2026

(54) LIGHTING DEVICE FOR A MOTOR VEHICLE HAVING MULTI-PART COLLIMATING OPTICS AND SECONDARY OPTICS

(71) Applicant: HELLA GMBH & CO. KGAA, Lippstadt (DE)

(72) Inventors: Bernd Fischer, Altenbeken (DE); Marc Kaup, Paderborn (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 0 days.

(21) Appl. No.: 19/131,716

(22) PCT Filed: Nov. 22, 2022

(86) PCT No.: PCT/EP2022/082713

§ 371 (c)(1),
(2) Date: May 21, 2025

(87) PCT Pub. No.: WO2024/110012

PCT Pub. Date: May 30, 2024

(65) Prior Publication Data

US 2026/0194199 A1 Jul. 9, 2026

(51) Int. Cl.
*F21S 41/20* (2018.01)
*F21S 41/151* (2018.01)

(52) U.S. Cl.
CPC .......... *F21S 41/285* (2018.01); *F21S 41/151* (2018.01)

(58) Field of Classification Search
CPC ........ F21S 41/20; F21S 41/285; F21S 41/141; F21S 41/151
See application file for complete search history.

(56) References Cited

U.S. PATENT DOCUMENTS 1,261,570 A * 4/1918 Lyons .................... F21S 41/43 362/311.03
2026/0055864 A1* 2/2026 Fischer ................ F21S 41/285

FOREIGN PATENT DOCUMENTS

| | | | |
|---|---|---|---|
| CN | 216113818 | U | 3/2022 |
| DE | 102014210500 | A1 | 12/2015 |
| DE | 102017102345 | A1 | 8/2018 |
| DE | 102018107213 | A1 | 10/2019 |
| DE | 102020102226 | A1 | 8/2021 |
| EP | 3633262 | A1 | 4/2020 |
| FR | 3079597 | A1 | 10/2019 |

OTHER PUBLICATIONS

Translation DE 102015210500A1 (Year: 2015).*

* cited by examiner

*Primary Examiner* — Robert J May
(74) *Attorney, Agent, or Firm* — WARNER NORCROSS + JUDD LLP

(57) ABSTRACT

Lighting device for a motor vehicle, in particular headlamp for a motor vehicle. The lighting device includes at least one light source, collimating optics with at least one collimating lens, and secondary optics, wherein the lighting device is arranged for light emanating from the at least one light source to pass successively through the collimating optics and through the secondary optics, and wherein the collimating optics comprises a first part consisting of plastic and a second part consisting of glass.

13 Claims, 2 Drawing Sheets

LIGHTING DEVICE FOR A MOTOR VEHICLE HAVING MULTI-PART COLLIMATING OPTICS AND SECONDARY OPTICS

CROSS-REFERENCE TO RELATED APPLICATIONS

This application is the National Stage of International Application No. PCT/EP 2022/082713 filed on Nov. 22, 2022, the disclosure of which is hereby incorporated by reference in its entirety.

BACKGROUND

The present invention relates to a lighting device for a motor vehicle, in particular a headlamp for a motor vehicle, and to a method of manufacturing such a lighting device.

A lighting device of the aforementioned type is known from DE 10 2018 107 213 A1. The lighting device described therein is designed as a low beam module of a headlamp and comprises three light-emitting diodes (LEDs) arranged next to one another in a horizontal row, from which light is emitted during operation of the lighting device. The lighting device further comprises collimating optics having three collimating lenses arranged side by side in a horizontal row. In each case, one of the collimating lenses is associated with one of the light sources so that the light emanating from one of the light sources passes through the associated collimating lens. In this case, each of the collimating lenses has an entrance surface facing the associated light source and an exit surface opposite thereto. An aperture opening is disposed on the entrance surface of each of the collimating lenses. The illumination device further comprises a secondary optics through which the light emitted from the collimating optics passes.

In a first of the embodiments of a headlamp described in DE 10 2018 107 213 A1, the collimating optics is formed in a comparatively complicated manner from a collimating lens section and an extension section extending therefrom toward the light sources. The collimating lens section is made of a polycarbonate, whereas the extension section is made of a silicone material to provide thermal decoupling between the collimating lens section and the light sources. The production of these collimating optics consisting of several different plastic materials is comparatively expensive. In a second of the embodiments of a headlamp described in DE 10 2018 107 213 A1, the collimating optics are made of glass. The production of a collimation optic made of glass is also comparatively expensive.

SUMMARY

The object of the present invention is to provide a lighting device of the type mentioned above which can be manufactured inexpensively. Furthermore, a method for manufacturing such a lighting device is to be disclosed.

This is achieved by a lighting device of the type mentioned at the beginning with features described herein as well as by a method of the type mentioned at the beginning with method steps described herein.

According to one embodiment, it is provided that the collimating optics comprises a first part consisting of plastic and a second part consisting of glass. Thereby, the first part may comprise the at least one collimating lens and the second part may be arranged on the side of the collimating optics facing the at least one light source. The second part comprising glass can thus thermally decouple the first part comprising the at least one collimating lens, which is made of plastic, from the at least one light source. In contrast to the prior art, only the second part, in particular a small second part, has to be manufactured of glass in this case, so that the manufacturing costs of the lighting device can be reduced. Also, in contrast to the collimating optics consisting of several different plastic materials, the manufacturing costs can be reduced.

It can be provided that the collimation optics has at least one aperture opening. Thereby, the at least one aperture opening may be arranged on the second part of the collimation optics, in particular arranged on the side of the second part facing the at least one light source. Preferably, the at least one aperture opening may be formed as an opening in an opaque layer on the second part of the collimating optics, wherein the opaque layer is in particular a metal layer. Heat is introduced into the opaque layer by the at least one light source during operation of the lighting device. Therefore, the arrangement of the aperture opening on the side facing away from the first part improves the thermal decoupling of the first part consisting of plastic from the at least one light source.

It is possible for the illumination device to comprise a plurality of light sources, a plurality of aperture openings, and a plurality of collimating lenses. In each case, one of the light sources may be associated with one of the apertures and one of the collimating lenses such that light emanating from the light source passes sequentially through the associated aperture and the associated collimating lens. For example, in this case, the light sources, the aperture openings and the collimating lenses can each be arranged next to one another in at least one row in a first direction which corresponds to a horizontal direction when the lighting device is installed in the vehicle. In this way, a very compact module can be created with which several lighting functions can be implemented despite its small size.

It may be provided that the second part of the collimating optics is strip-shaped and has a longitudinal direction that is parallel to the first direction, in particular wherein the second part extends in the first direction substantially over the entire width of the collimating optics. Thus, all aperture openings for the light sources can be arranged at the second part, which is formed as a thermally insulating glass strip.

According to another embodiment, the first part of the collimating optics is made of plastic and the second part of the collimating optics is attached to the side of the first part facing the at least one light source.

It is possible that the first part of the collimating optics is made of plastic by an injection molding process. If the entire first part of the collimation optics is to be made of the same plastic, this first part can be manufactured comparatively inexpensively by an injection molding process.

A recess for receiving the second part may be provided in the first part on the side facing the at least one light source. Such a recess can facilitate the positioning of the second part on the first part, in particular if the inner dimensions of the recess substantially correspond to the outer dimensions of the second part.

It is possible that the second part of the collimating optics is adhered to the side of the first part facing the at least one light source, in particular by a silicone adhesive or a UV adhesive. Adhering the second part to the first part also represents a comparatively inexpensive manufacturing method.

For example, for this purpose, at least one receptacle, preferably a plurality of receptacles, can be arranged in the first part on the side facing the at least one light source, into which receptacle adhesive for bonding the second part is introduced before the second part is bonded, in particular wherein the at least one receptacle is arranged in the recess. Furthermore, at least one contact surface, preferably a plurality of contact surfaces, for the second part may be formed on the first part on the side facing the at least one light source, in particular wherein the at least one contact surface is arranged adjacent to the at least one receptacle in the recess. After the adhesive has been introduced into the at least one receptacle, the second part can be pressed against the at least one contact surface of the first part to firmly join the parts together.

BRIEF DESCRIPTION OF THE DRAWINGS

With reference to the accompanying drawings, the invention is explained in more detail below. Thereby shows:

FIG. 1 shows an exploded view of the collimating optics shown in FIG. 1;

DETAILED DESCRIPTION

In the figures, identical or functionally identical parts are given the same reference signs. A Cartesian coordinate system is drawn in some of the figures for better orientation.

The embodiment of a lighting device according to the invention illustrated in the figures is designed as a headlamp. The lighting device comprises a plurality of light sources not shown, a collimating optics 1 and a secondary optics not shown.

The light sources are in the form of light-emitting diodes (LEDs) from which light is emitted during operation of the lighting device. For example, the illustrated embodiment of the lighting device can have a row of three light-emitting diodes spaced apart from one another. The light-emitting diodes can in particular be arranged on a common printed circuit board.

Figure 1:
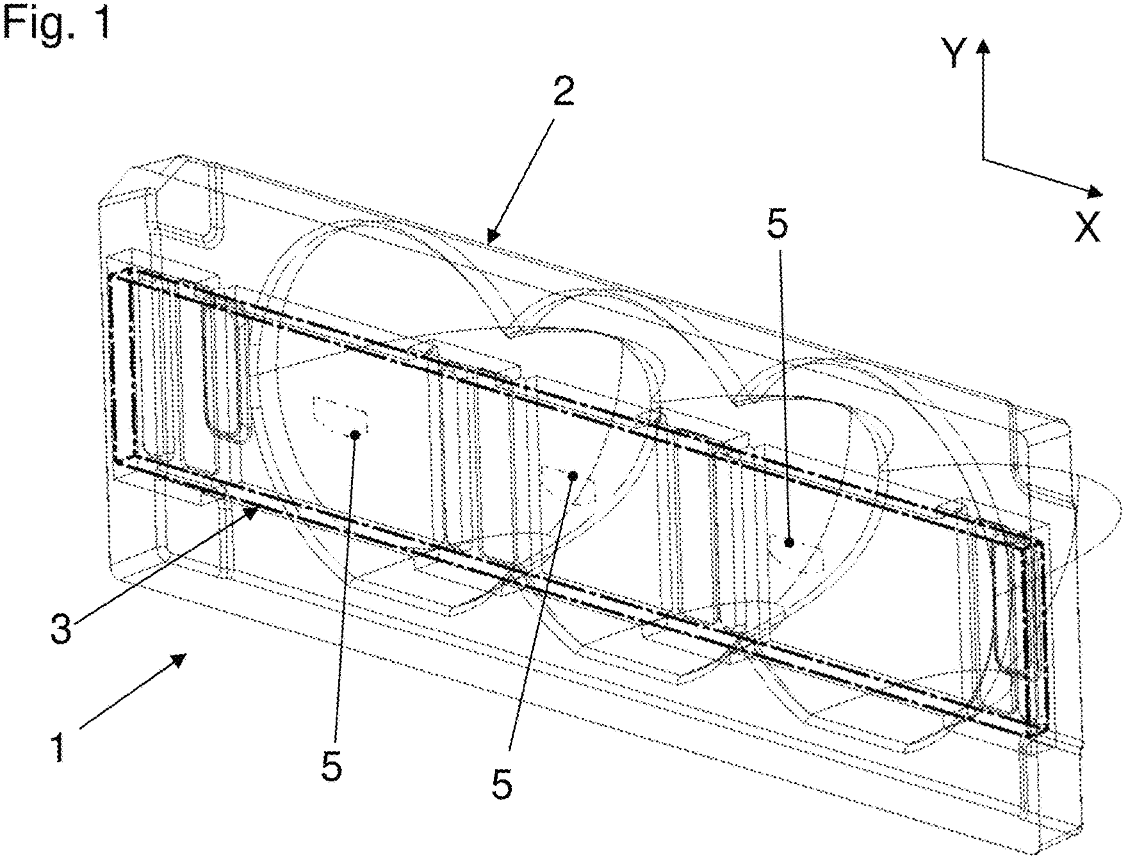
FIG. 1 shows a perspective view of the collimating optics of a lighting device according to the invention.
Figure 4:
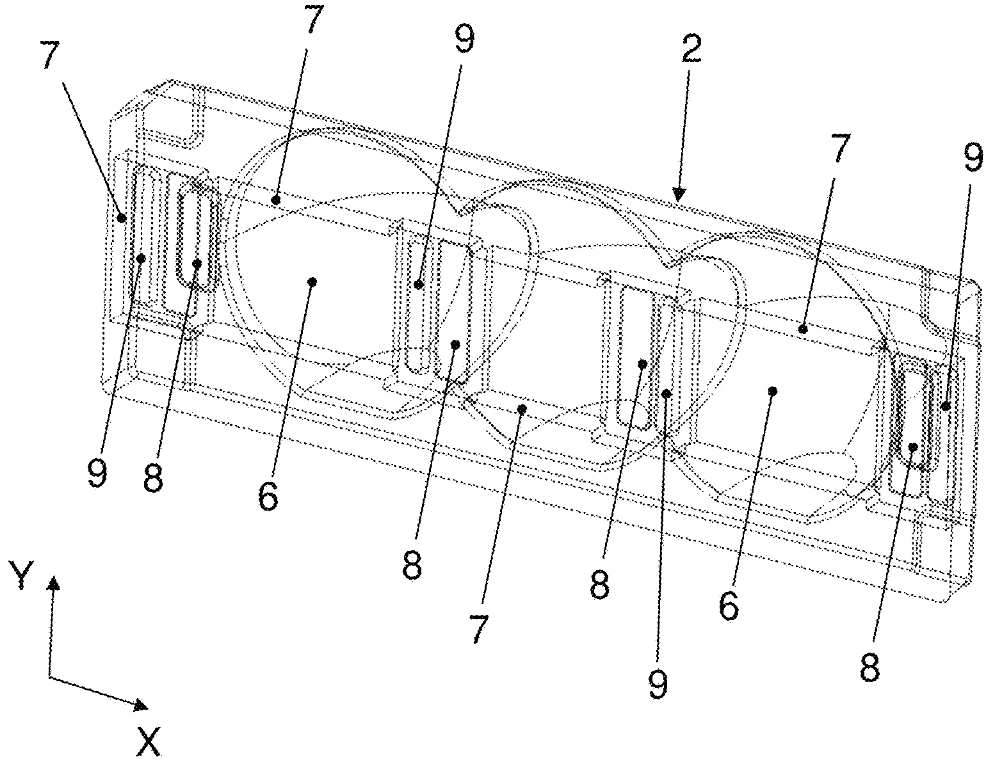
FIG. 4 shows another perspective view of the first part of the collimating optics according to FIG. 1.

The light emitting diodes are arranged next to each other in a first direction X, which corresponds to the horizontal direction or the transverse direction of the motor vehicle when installed in it. A second direction Y perpendicular to this, which corresponds to the vertical direction when installed in the motor vehicle, is also indicated in FIG. 1 and FIG. 4.

Figure 2:
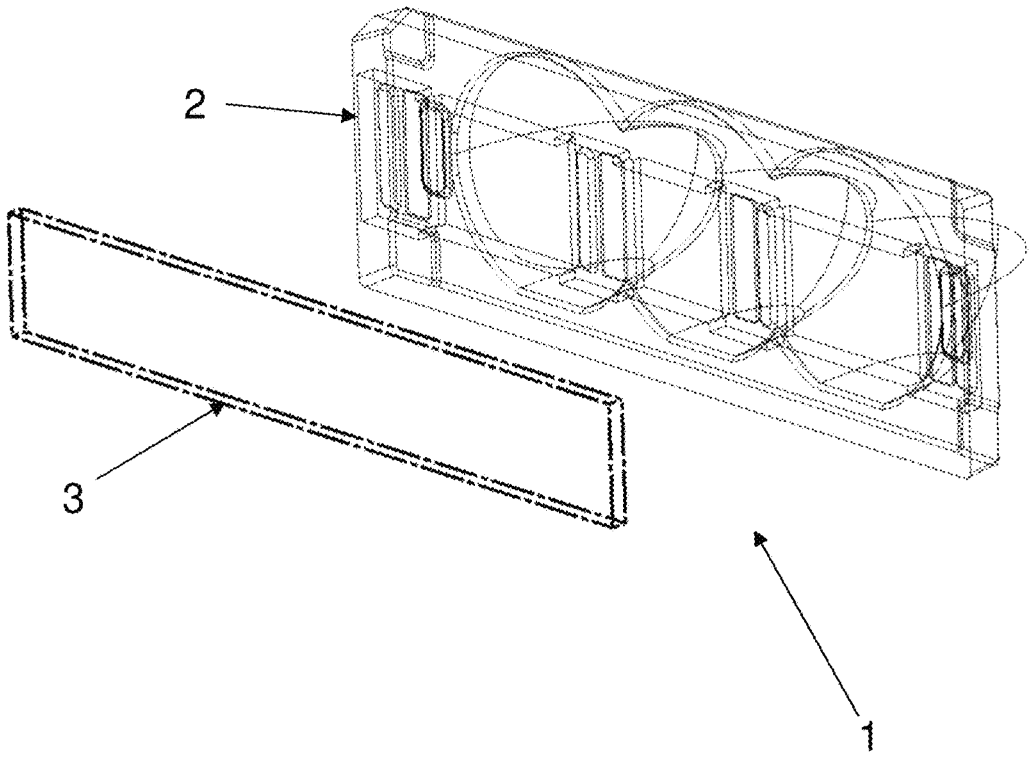

The collimating optics 1 has a first part 2 and a second part 3 (see FIG. 2).

Figure 3:
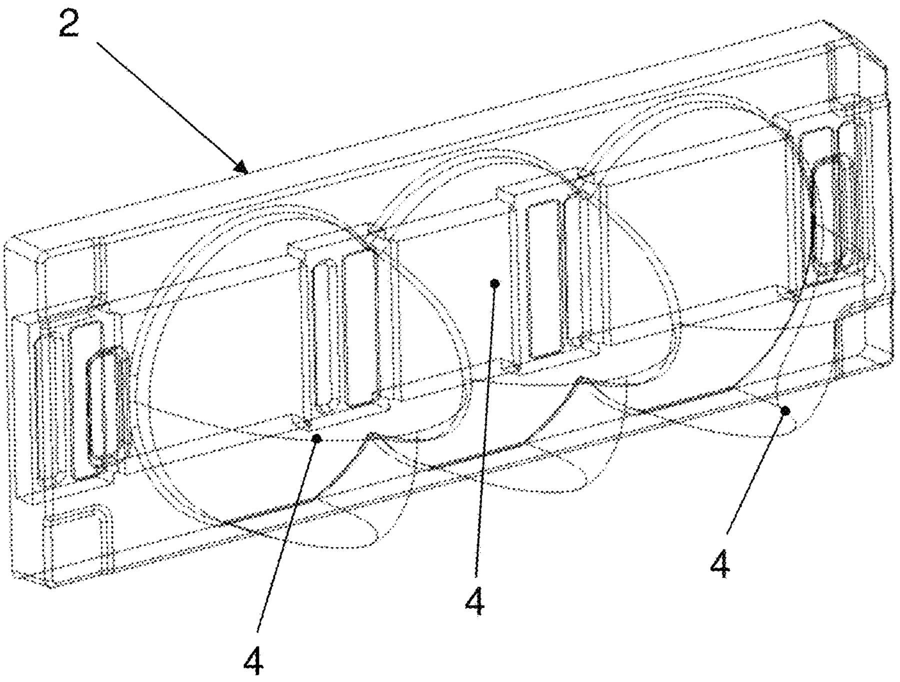
FIG. 3 shows a perspective view of the first part of the collimating optics according to FIG. 1.

The first part 2 is made of plastic. Three collimating lenses 4 are formed on the first part 2, which are arranged on the side of the first part 2 facing away from the light sources in the assembled state of the lighting device (see FIG. 3). The collimating lenses 4 are also arranged side by side in the first direction X.

The second part 3 is made of glass. In the assembled state of the lighting device, the second part 3 is arranged between the first part 2 and the light sources. The second part 3 has the shape of a narrow strip, the longitudinal direction of which is parallel to the first direction X.

The collimating optics 1 further has three aperture openings 5 arranged on the side of the second part 3 facing the light sources (see FIG. 1). The aperture openings 5 are also arranged next to each other in the first direction X. In each case, one of the aperture openings 5 and one of the collimating lenses 4 is assigned to one of the light sources in such a way that the light emanating from the light source passes through the assigned aperture opening 5 and the assigned collimating lens 4 in succession.

It may be provided that the lower edge of one, several or each of the aperture openings 5 is imaged by the optics of the lighting device formed by the collimating optics 1 and the secondary optics as a horizontal cutoff into the exterior space of the motor vehicle.

The aperture openings 5 are each formed as an opening in an opaque layer on the second part 3. This opaque layer can be applied in particular by vapor deposition or painting, whereby the opening can be introduced into the layer by exposure to laser radiation. The opaque layer can in particular be a metal layer.

The first part 2 of the collimating optics 1 has a recess 6 on its side facing the second part 3 for receiving the second part 3. The recess 6 extends into the first part 2 and has an at least partially circumferential edge 7. In the illustrated embodiment, four mutually spaced receptacles 8 are arranged in the recess 6. Furthermore, four contact surfaces 9 are provided, which are arranged adjacent to the receptacles 8 in the recess 6 (see FIG. 4).

The first part 2 of the collimating optics 1 can be manufactured, for example, by an injection molding process. The opaque layer with the aperture openings 5 can be applied to the second part 3 before it is joined to the first part 2.

Adhesive is introduced into the receptacle 8 to join the two parts 2, 3 together. This can be, for example, a silicone adhesive or a UV adhesive. The second part 3 is then pressed into the recess 6 of the first part 2 until the second part 3 rests against the contact surfaces 9. In particular, the inner dimensions of the recess 6 can essentially correspond to the outer dimensions of the second part 3, so that the second part 3 rests against the edge 7 of the recess 6 from the inside.

After the adhesive has cured, the two parts 2, 3 are securely joined. When using a UV adhesive, the area where the two parts 2, 3 are joined is exposed to UV light for this purpose.

LIST OF REFERENCE SIGNS

1 Collimating optics
2 First part of the collimating optics
3 Second part of the collimating optics
4 Collimating lens of the collimating optics
5 Aperture opening
6 Recess
7 Recess edge
8 Receptacle in the recess
9 Contact surface in the recess
X First direction or horizontal direction
Y Second direction or vertical direction The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles “a,” “an,” “the,” or “said,” is not to be construed as limiting the element to the singular.

The invention claimed is:

1. A lighting device for a headlamp for a motor vehicle, comprising:

at least one light source, collimating optics with at least one collimating lens, and secondary optics, wherein the lighting device is arranged for light emanating from the at least one light source to pass successively through the collimating optics and through the secondary optics, wherein the collimating optics comprises a first part consisting of plastic and a second part consisting of glass, wherein the second part is strip-shaped and has at least one aperture opening formed as an opening in an opaque layer on the second part, and wherein the second part is received in a recess formed in the first part on the side facing the at least one light source.

2. The lighting device according to claim 1, wherein the first part comprises the at least one collimating lens and that the second part is arranged on the side of the collimating optics facing the at least one light source.

3. The lighting device according to claim 1, wherein the at least one aperture opening is arranged on the side of the second part facing the at least one light source.

4. The lighting device according to claim 1, wherein the opaque layer is a metal layer.

5. The lighting device according to claim 1, wherein the lighting device comprises a plurality of light sources, a plurality of aperture openings, and a plurality of collimating lenses.

6. The lighting device according to claim 5, wherein in each case, one of said aperture openings and one of said collimating lenses is associated with one of said light sources in such a manner that light emanating from said light source passes successively through said associated aperture opening and said associated collimating lens.

7. The lighting device according to claim 5, wherein the light sources, the aperture openings, and the collimating lenses are each arranged next to one another in at least one row in a first direction which corresponds to a horizontal direction when the lighting device is installed in the motor vehicle.

8. The lighting device according to claim 7, wherein the second part of the collimating optics has a longitudinal direction that is parallel to the first direction, wherein the second part extends in the first direction substantially over the entire width of the collimating optics.

9. A method of manufacturing a lighting device according to claim 1, wherein the first part of the collimating optics is made of plastic and the second part of the collimating optics is inserted into the recess and attached to the side of the first part facing the at least one light source.

10. The method according to claim 9, wherein the first part of the collimating optics is made of plastic by an injection molding process.

11. The method according to claim 9, wherein the second part of the collimating optics is adhered to the side of the first part facing the at least one light source by a silicone adhesive or a UV adhesive.

12. The method according to claim 11, wherein at least one receptacle is arranged in the first part on the side facing the at least one light source, into which receptacle adhesive for bonding the second part is introduced before the second part is bonded, wherein the at least one receptacle is arranged in the recess.

13. The method according to claim 12, wherein at least one contact surface for the second part is formed on the first part on the side facing the at least one light source, wherein the at least one contact surface is arranged adjacent to the at least one receptacle in the recess.

* * * * *